United States Patent
Patel et al.

(10) Patent No.: US 10,720,809 B2
(45) Date of Patent: Jul. 21, 2020

(54) ROTOR WEDGES WITH EDDY CURRENT INHIBITORS

(71) Applicant: Hamilton Sundstrand Corporation, Charlotte, NC (US)

(72) Inventors: Dhaval Patel, Loves Park, IL (US); Andrew R. Wilkinson, Cherry Valley, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 86 days.

(21) Appl. No.: 15/818,242

(22) Filed: Nov. 20, 2017

(65) Prior Publication Data

US 2019/0157932 A1    May 23, 2019

(51) Int. Cl.

| H02K 3/00 | (2006.01) |
|---|---|
| *H02K 3/487* | (2006.01) |
| *H02K 15/00* | (2006.01) |
| *H02K 3/52* | (2006.01) |
| *H02K 15/02* | (2006.01) |
| *H02K 19/00* | (2006.01) |

(52) U.S. Cl.
CPC ............ *H02K 3/487* (2013.01); *H02K 3/527* (2013.01); *H02K 15/0018* (2013.01); *H02K 15/022* (2013.01); *H02K 19/00* (2013.01)

(58) Field of Classification Search
CPC ............ H02K 15/0018; H02K 15/022; H02K 15/024; H02K 1/22; H02K 1/223; H02K 1/26; H02K 1/265; H02K 1/27; H02K 19/00; H02K 3/46; H02K 3/48; H02K 3/487; H02K 3/493; H02K 3/527

USPC ..... 310/214, 215, 156.19, 216.082, 216.125, 310/216.126
See application file for complete search history.

(56) References Cited

U.S. PATENT DOCUMENTS

| 4,427,910 A * | 1/1984 | Richter | .................. H02K 3/493 310/214 |
|---|---|---|---|
| 4,843,271 A | 6/1989 | Shah | |
| 6,727,634 B2 * | 4/2004 | Tornquist | ................. H02K 1/24 310/270 |
| 6,791,230 B2 * | 9/2004 | Tornquist | ............... H02K 3/527 310/214 |
| 6,967,420 B2 * | 11/2005 | Laurent | ................ H02K 1/2773 310/156.51 |

(Continued)

FOREIGN PATENT DOCUMENTS

| CN | 202334060 U | 7/2012 |
|---|---|---|
| EP | 2985885 A1 | 2/2016 |

(Continued)

OTHER PUBLICATIONS

Electrical resistivity and conductivity from Wikipedia.*

(Continued)

*Primary Examiner* — Maged M Almawri
(74) *Attorney, Agent, or Firm* — Locke Lord LLP; Scott D. Wofsy; Joshua L. Jones

(57) ABSTRACT

A wedge for securing windings in a slot in the rotor poles of a rotor core of an electrical machine includes an elongate wedge body extending in an axial direction along a longitudinal axis. The wedge body includes layers perpendicular to the axial direction. The layers vary in electrical conductivity from layer to layer to inhibit eddy currents within the wedge body.

13 Claims, 3 Drawing Sheets

(56) References Cited

U.S. PATENT DOCUMENTS

| | | | |
|---|---|---|---|
| 6,979,929 B2* | 12/2005 | Tornquist | H02K 3/527 |
| | | | 310/194 |
| 2004/0232795 A1* | 11/2004 | Tornquist | H02K 3/527 |
| | | | 310/214 |
| 2005/0231058 A1* | 10/2005 | Down | H02K 3/527 |
| | | | 310/192 |
| 2014/0300240 A1* | 10/2014 | Hochstetler | H02K 3/527 |
| | | | 310/214 |
| 2017/0063183 A1 | 3/2017 | Shrestha et al. | |

FOREIGN PATENT DOCUMENTS

| | | |
|---|---|---|
| GB | 169482 A | 9/1921 |
| WO | 2014149761 A2 | 9/2014 |

OTHER PUBLICATIONS

IEEE8101866 Preview "The influence of rotor slot wedge material and conductivity on first swing stability of turbine generator" by Xu Guorui, date 2017, IEEE article overview.*

Extended European Search Report dated Mar. 27, 2019, issued during the prosecution of corresponding European Patent Application No. EP 18206302.4.

* cited by examiner

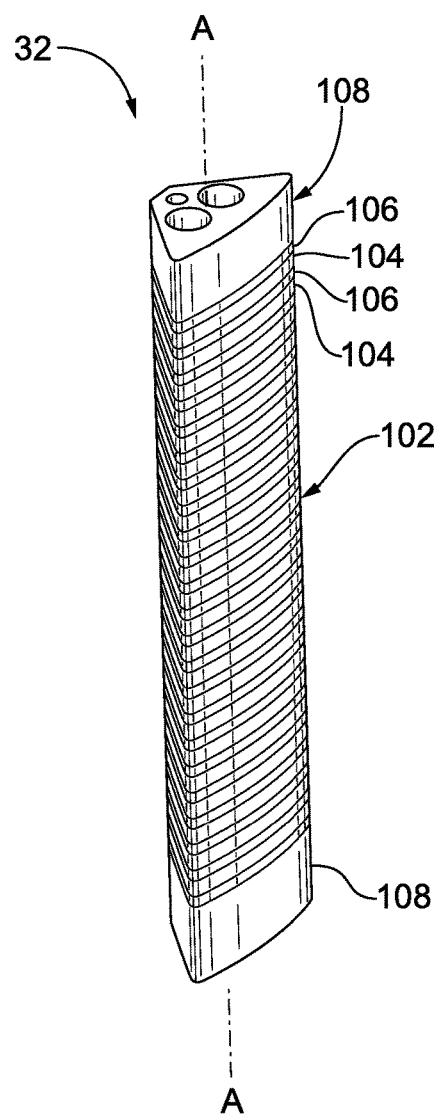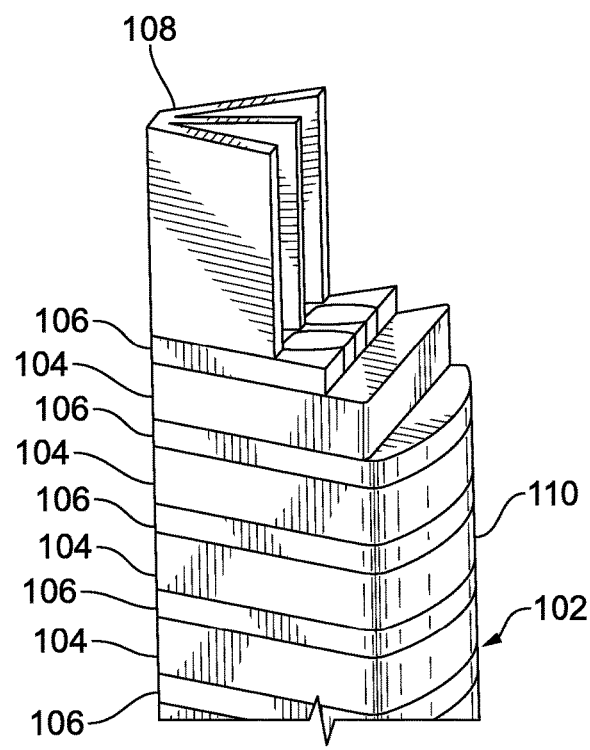
FIG. 4
FIG. 5

ROTOR WEDGES WITH EDDY CURRENT INHIBITORS

BACKGROUND OF THE INVENTION

1. Field of the Invention

The present disclosure relates to wedges for rotor cores, and more particularly to wedges for rotor cores in synchronous generators and the like.

2. Description of Related Art

Typically, a generator includes a rotor having a plurality of field coils, or windings. The rotor is driven by a rotating prime mover, such as a turbine rotor. The rotor rotates in proximity to a stator, and the rotation of the rotor generates current in stator windings. Generator wedges are used to support the windings under centrifugal load.

The wedges are typically radially supported by a main field lamination stack. Given the significant centrifugal loading within a high speed generator, the stresses on the main field lamination often drive the selection of a lamination material, and this results in a compromise as to magnetic properties as well as lamination geometry.

There has been a need for a generator rotor and wedge design that can reduce or eliminate the need for compromise in lamination magnetic properties and geometries, due to rotor wedge retention considerations.

The conventional techniques have been considered satisfactory for their intended purpose. However, there is an ever present need for improved rotor wedges. This disclosure provides a solution for this need.

SUMMARY OF THE INVENTION

A wedge for securing windings in a slot in the rotor poles of a rotor core of an electrical machine includes an elongate wedge body extending in an axial direction along a longitudinal axis. The wedge body includes layers perpendicular to the axial direction. The layers vary in electrical conductivity from layer to layer to inhibit eddy currents within the wedge body.

The layers can include alternating layers of two materials, a first material and a second material with a lower electrical conductivity than that of the first material. The first material can include aluminum. The second material can include at least one non-magnetic stainless steel, titanium, and/or Inconel® alloy available from Specialty Metals Corporation of New Hartford, N.Y. Each of the layers can extend across a complete cross-section of the wedge body so the only electrical path from a first one of the layers to a third one of the layers spaced apart from the first one of the layers is through a second one of the layers separating the first one of the layers from the second one of the layers.

The wedge can include two opposed end sections one at either end of the layers. The end sections can include aluminum. The wedge body can be smooth from layer to layer along an outer surface that is curved to form a portion of an outer cylindrical surface of a rotor core for an electrical machine.

A rotor for an electrical machine includes a rotor core having a plurality of circumferentially spaced apart rotor poles. A plurality of windings is seated in slots between circumferentially adjacent pairs of the rotor poles. A respective wedge as described above secures the windings in each slot.

The rotor core can be operatively connected to a stator in a synchronous generator. The rotor can include a rotor sleeve, wherein the layers of each respective wedge are flush with respect to an inner surface of the rotor sleeve. It is also contemplated that the layers of each respective wedge can be flush at a cylindrical outer surface with one another and wherein the rotor is sleeveless.

A method of manufacturing a wedge for rotor of an electrical machine includes additively manufacturing a wedge body with bi-metallic layers in a direction perpendicular to a longitudinal axis of the wedge body that vary in electrical conductivity from layer to layer to inhibit eddy currents in the wedge body.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 4 is a perspective view of one of the wedges of FIG. 2, showing the layers; and FIG. 5 is a partially cross-sectional perspective view of a portion of the wedge of FIG. 4, showing one of the end sections.

DETAILED DESCRIPTION OF THE PREFERRED EMBODIMENTS

Figure 1:
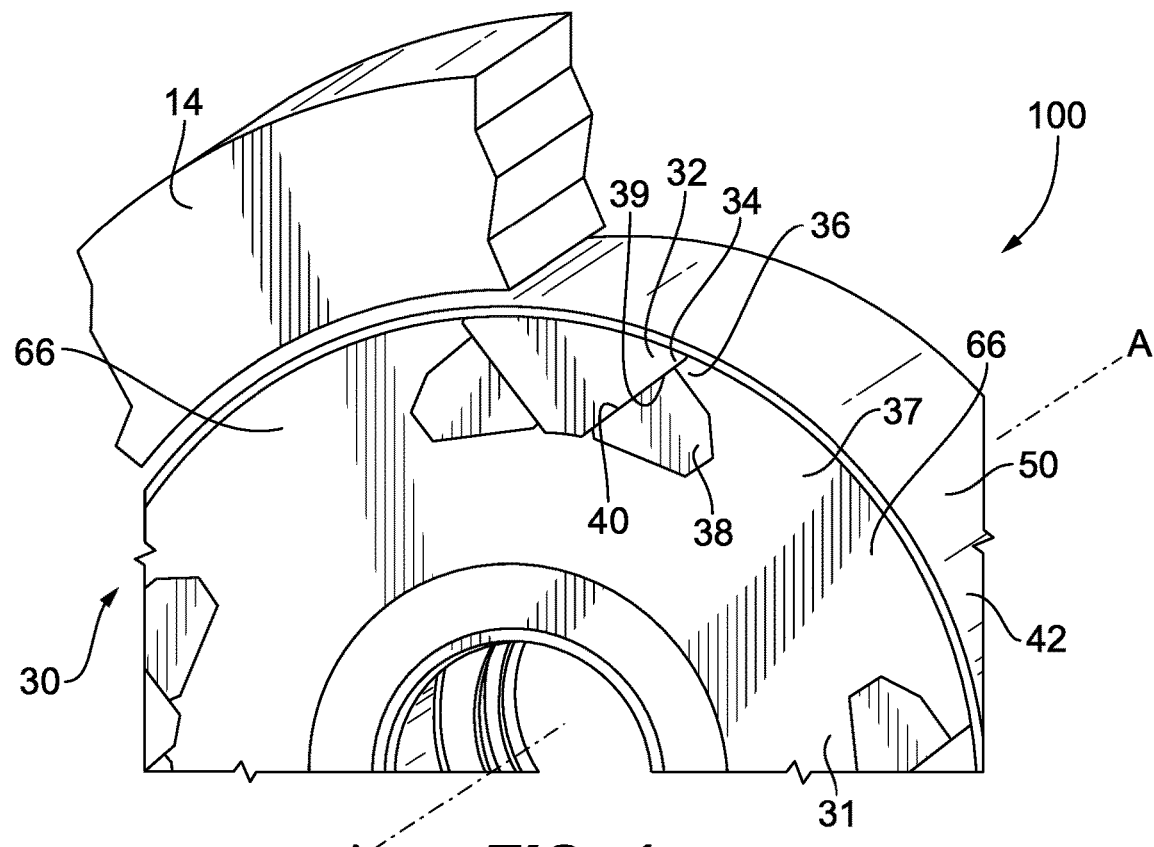
FIG. 1 is a schematic perspective view of an exemplary embodiment of a generator constructed in accordance with the present disclosure, showing the rotor and the stator.

Reference will now be made to the drawings wherein like reference numerals identify similar structural features or aspects of the subject disclosure. For purposes of explanation and illustration, and not limitation, a partial view of an exemplary embodiment of a generator in accordance with the disclosure is shown in FIG. 1 and is designated generally by reference character 100. Other embodiments of generators in accordance with the disclosure, or aspects thereof, are provided in FIGS. 2-5, as will be described. The systems and methods described herein can be used to inhibit eddy currents in wedges for electrical machines such as synchronous generators.

In generator 100, a rotor 31 rotates adjacent to a stator 14. The wedge 32 has circumferential edge surfaces 34 that sit along a radially outer surface 36 of the lamination stack 37. The terms radial and circumferential are defined relative to a rotational axis A of the rotors. Generally flat side surfaces 39 of each wedge 32 extend to a radially outermost extent of the wedge 32 and sit along a flat surface 40 of the windings 38, and a flat outer surface of the portion 36 of the lamination stack 37. Lamination stack 37 forms a rotor core with circumferentially spaced poles 66. The wedges 32 secure windings 38 in the slots in the rotor poles 66 of the rotor core. A containment sleeve 50 surrounds the lamination stack 37 and the wedges 32.

Figure 2:
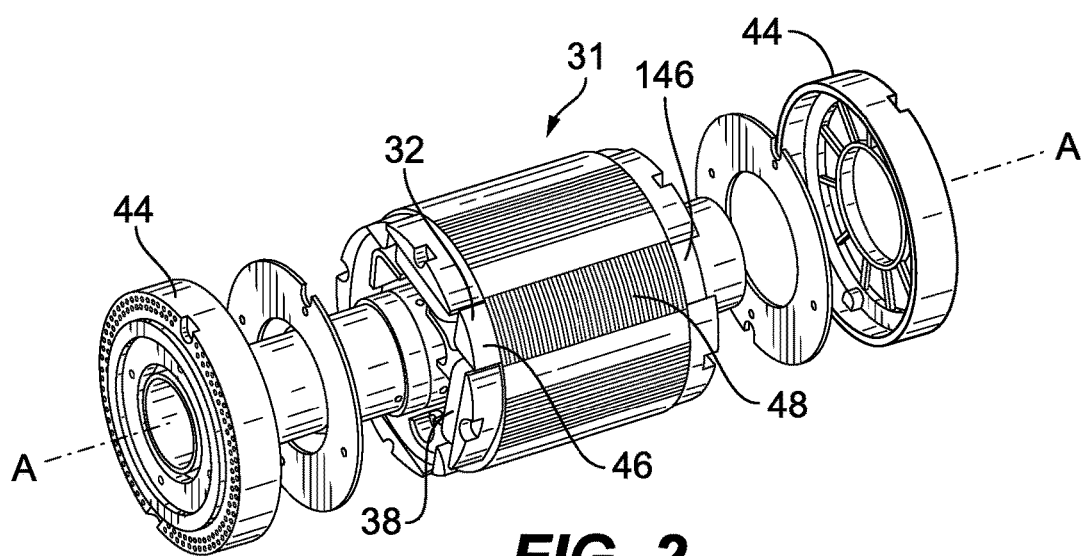
FIG. 2 is an exploded perspective view of the rotor of FIG. 1, showing the windings and wedges.
Figure 3:
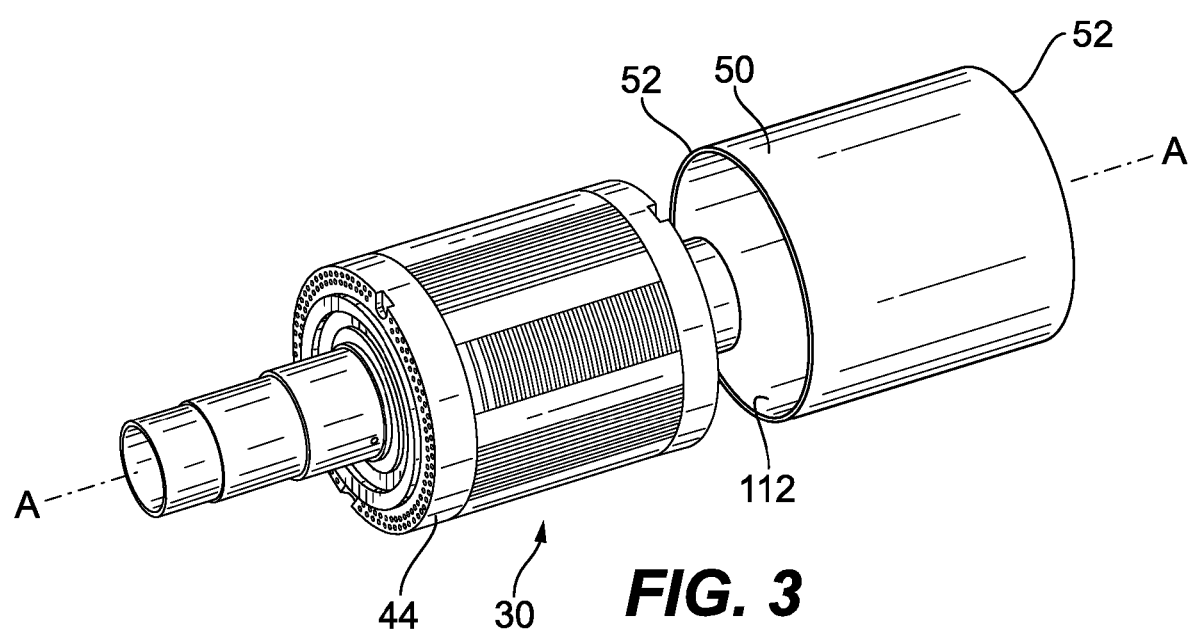
FIG. 3 is an exploded perspective view of the rotor of FIG. 1, showing the containment sleeve.

As can be appreciated from FIG. 2, the assembled rotor 31 has plates 44 that sit on end surfaces 46 and 146 of the wedges 32. The plates 44 provide a reaction surface for radial forces on the wedges, and at the end surfaces 46 and 146. As shown in FIG. 3, the containment sleeve 50 has ends 52 that will cover the plates 44 and the remainder of the rotor 31 when assembled. The containment sleeve 50 may be formed of a carbon fiber composite, or other suitable materials. The containment sleeve 50 is an interference fit on the wedges 32, the plates 44, and the lamination stack 37. Thus, the containment sleeve provides the radial support for the wedges 32.

One of the wedges 32 is shown in greater detail in FIG. 4. The wedge 32 includes an elongate wedge body 102 extending in an axial direction along a longitudinal axis A, which is shown in FIGS. 1-3. The wedge body 102 includes layers 104 and 106 that are perpendicular to the axial direction identified in FIG. 4 with the double arrow. The layers 104 and 106 vary in electrical conductivity from layer to layer to inhibit eddy currents within the wedge body 102. Only a few of the layers 104 and 106 are labeled in FIG. 4 for sake of clarity.

The layers 104 and 106 include alternating layers of two materials, a first material and a second material with a lower electrical conductivity than that of the first material. Layers 104 include the first material, which can be aluminum. The layers 106 which alternate with layers 104 include the second material which can include non-magnetic stainless steel, titanium, and/or Inconel® alloys available from Specialty Metals Corporation of New Hartford, N.Y. Any other suitable material can be used for the second material such as low- or non-magnetic materials, e.g., Series 300 stainless steels.

Each of the layers 104 and 106 extends across a complete cross-section of the wedge body 102 so the only electrical path from a first one of the layers, e.g., the topmost layer 106 in FIG. 4, to a third one of the layers, e.g., the second to the highest layer 106 in FIG. 4, that is spaced apart from the first one of the layers is through a second one of the layers, e.g., the top most layer 104 in FIG. 4, separating the first one of the layers from the second one of the layers. In other words, the layers 104 are completely separated from one another by respective layers 106. The change in electrical properties from layer to layer through the layers 104 and 106 provides a break on eddy currents in wedge body 102. The light weight of aluminum for layers 104, for example, gives the advantages of light weight to wedges 32. The relatively low electrical conductivity of layers 106 provides the break on eddy currents. Together, layers 104 and 106 provide light weight, high strength, and inhibit eddy currents.

The wedge 32 includes two opposed end sections 108 one at either end of the layers 104 and 106. The end sections 108 include aluminum. FIG. 5 shows one of the ends 108 and some of the layers 104 and 106 in partial cross-section. The wedge body 102 is smooth from layer to layer along an outer surface 110 that is curved to form a portion of an outer cylindrical surface of a rotor core for an electrical machine. The rotor can include a rotor sleeve, namely containment sleeve 50, as shown in FIG. 3, wherein the layers 104 and 106 of each respective wedge are flush with respect to an inner surface 112 of the rotor sleeve. It is also contemplated that the layers 104 and 106 of each respective wedge 32 can be flush at the cylindrical outer surface 110 with one another, wherein the rotor is sleeveless as shown in FIG. 2. The smoothness of the outer surface 110 means there need be no mechanical stress risers along wedge body 102.

A method of manufacturing a wedge, e.g., wedge 32, for rotor of an electrical machine includes additively manufacturing a wedge body with bi-metallic layers in a direction perpendicular to a longitudinal axis of the wedge body that vary in electrical conductivity from layer to layer to inhibit eddy currents in the wedge body. Since the layers 106 can be printed across the entire cross-section of the wedge body 102, the eddy currents in the skin are not relevant. The skin depth equation which depends on rotor frequency is also irrelevant, and the rotor is thus invariant to changing frequencies. This is advantageous for variable frequency AC generators, for example.

Those skilled in the art will readily appreciate that the layer thicknesses and number of layers 104 and 106 shown in the Figures is exemplary, and any suitable layer thicknesses and number of layers can be used without departing from the scope of this disclosure. For example, the layers 106 can be 30-60 microns thick and the wedge can be printed in 30-60 micron passes. A balance can be struck from application to application between thickness of the layers 104, where the wedge 32 is lighter if the layers 104 are thicker but the thicker are layers 104, the greater will be the expected losses.

The methods and systems of the present disclosure, as described above and shown in the drawings, provide for rotor wedges with superior properties including light weight, high strength, and reduced or eliminated eddy currents. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A wedge for securing windings in a slot in rotor poles of a rotor core of an electrical machine comprising:
an elongate wedge body extending in an axial direction along a longitudinal axis, wherein the wedge body includes layers perpendicular to the axial direction, wherein the layers vary in electrical conductivity from layer to layer to inhibit eddy currents within the wedge body, wherein the wedge includes two opposed end sections one at either end of the layers, wherein the end sections include aluminum, wherein the wedge body is smooth from layer to layer along an outer surface that is curved to form a portion of an outer cylindrical surface of the rotor core for an electrical machine.

2. The wedge as recited in claim 1, wherein each of the layers extends across a complete cross-section of the wedge body so the only electrical path from a first one of the layers to a third one of the layers spaced apart from the first one of the layers is through a second one of the layers separating the first one of the layers from the second one of the layers.

3. The wedge as recited in claim 1, wherein the layers include alternating layers of two materials, a first material and a second material with a lower electrical conductivity than that of the first material.

4. The wedge as recited in claim 3, wherein the first material includes aluminum.

5. The wedge as recited in claim 3, wherein the second material includes at least one of non-magnetic stainless steel, titanium, and/or Inconel.

6. A rotor for an electrical machine comprising:
a rotor core having a plurality of circumferentially spaced apart rotor poles;

a plurality of windings seated in slots between circumferentially adjacent pairs of the rotor poles;

a respective wedge securing the windings in each slot, wherein the wedge includes an elongate wedge body extending in an axial direction along a longitudinal axis, wherein the wedge body includes layers perpendicular to the axial direction, wherein the layers vary in electrical conductivity from layer to layer to inhibit eddy currents within the wedge body, wherein the wedge includes two opposed end sections one at either end of the layers, wherein the wedge includes two opposed end sections one at either end of the layers, wherein the wedge body is smooth from layer to layer along an outer surface that is curved to form a portion of an outer cylindrical surface of the rotor core for an electrical machine.

7. The rotor as recited in claim 6, wherein each of the layers extends across a complete cross-section of the wedge body so the only electrical path from a first one of the layers to a third one of the layers spaced apart from the first one of the layers is through a second one of the layers separating the first one of the layers from the second one of the layers.

8. The rotor as recited in claim 6, wherein the rotor core is operatively connected to a stator in a synchronous generator.

9. The rotor as recited in claim 6, further comprising a rotor sleeve, wherein the layers of each respective wedge are flush with respect to an inner surface of the rotor sleeve.

10. The rotor as recited in claim 6, wherein the layers of each respective wedge are flush at a cylindrical outer surface with one another and wherein the rotor is sleeveless.

11. The rotor as recited in claim 6, wherein the layers include alternating layers of two materials, a first material and a second material with a lower electrical conductivity than that of the first material.

12. The rotor as recited in claim 11, wherein the first material includes aluminum.

13. The rotor as recited in claim 11, wherein the second material includes at least one of non-magnetic stainless steel, titanium, and/or Inconel.

\* \* \* \* \*